Sept. 2, 1958     F. L. BOEKE ET AL     2,849,760
MOISTURE REMOVAL MEANS

Filed April 19, 1954     3 Sheets-Sheet 1

INVENTORS
FRED L. BOEKE
JAMES A. DUNHAM
BY
William R. Lane
ATTORNEY

Sept. 2, 1958  F. L. BOEKE ET AL  2,849,760
MOISTURE REMOVAL MEANS

Filed April 19, 1954  3 Sheets-Sheet 3

INVENTORS
FRED L. BOEKE
JAMES A. DUNHAM
BY
William R. Lane
ATTORNEY

United States Patent Office 2,849,760
Patented Sept. 2, 1958

2,849,760
MOISTURE REMOVAL MEANS

Fred L. Boeke, Los Angeles, and James A. Dunham, Burbank, Calif., assignors to North American Aviation, Inc.

Application April 19, 1954, Serial No. 423,904

4 Claims. (Cl. 20—40.5)

This invention pertains to a moisture prevention method and means and more particularly to an arrangement for preventing rain and ice coatings on the exterior of a panel of a vehicle.

The invention described herein is particularly applicable to modern high-performance aircraft, but is also applicable to any vehicle where rain and ice removal are a problem. Preventing the collection of rain and ice on the windshield of a modern aircraft has become an increasingly difficult problem as aircraft approach and landing velocities become greater. Conventional windshield wipers are undesirable primarily because of the aerodynamic disturbance they cause and the resulting high drag penalty, even when the wipers are not in use. However, the need for rain and ice removal is even more critical as the aircraft speeds increase. Generally speaking this invention effects rain and ice prevention on a panel of a vehicle by directing a high-speed stream of air along the surface of the panel to be protected. This is discharged at substantially sonic velocity and will result in a mechanical deflection of the moisture particles so that they are carried away by the air-stream and do not form on the panel.

Therefore, it is an object of this invention to provide an arrangement for preventing moisture collection on the exterior panel of a vehicle.

Another object of this invention is to provide an arrangement which will both remove rain and prevent ice formation on the panel of a vehicle.

A further object of this invention is to provide an arrangement where moisture particles may be deflected by a high-speed air flow.

Yet another object of this invention is to provide an arrangement whereby rain removal and anti-icing may be effected without resulting in an aerodynamic disturbance.

A still further object of this invention is to provide an arrangement whereby air from the compressor of a jet engine may be used in effecting rain removal and anti-icing.

These and other objects will become apparent from the following detailed description taken in connection with the accompanying drawings in which Fig. 1 is a perspective view of the moisture prevention arrangement of this invention installed on an aircraft;

Figure 1:
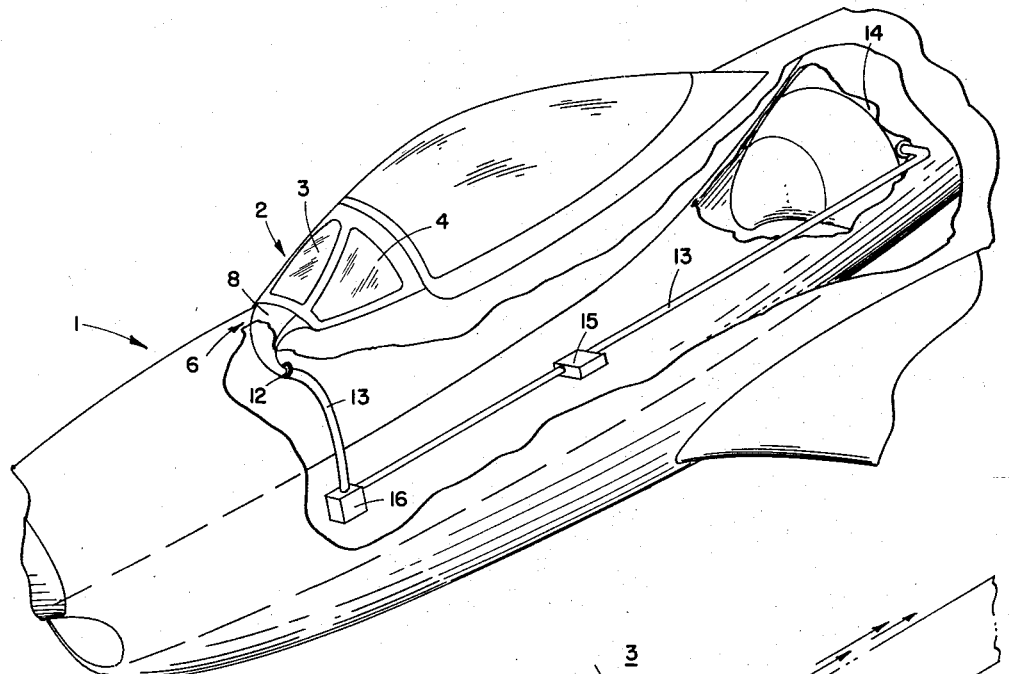

Referring to the drawings, this invention is adapted for use in a vehicle, being particularly usable in a fast moving vehicle such as jet powered aircraft 1. This aircraft has a windshield 2 provided with a front panel 3 and two side panels 4, which panels should be kept clear of ice and rain for maximum visibility by the pilot.

Figure 4:
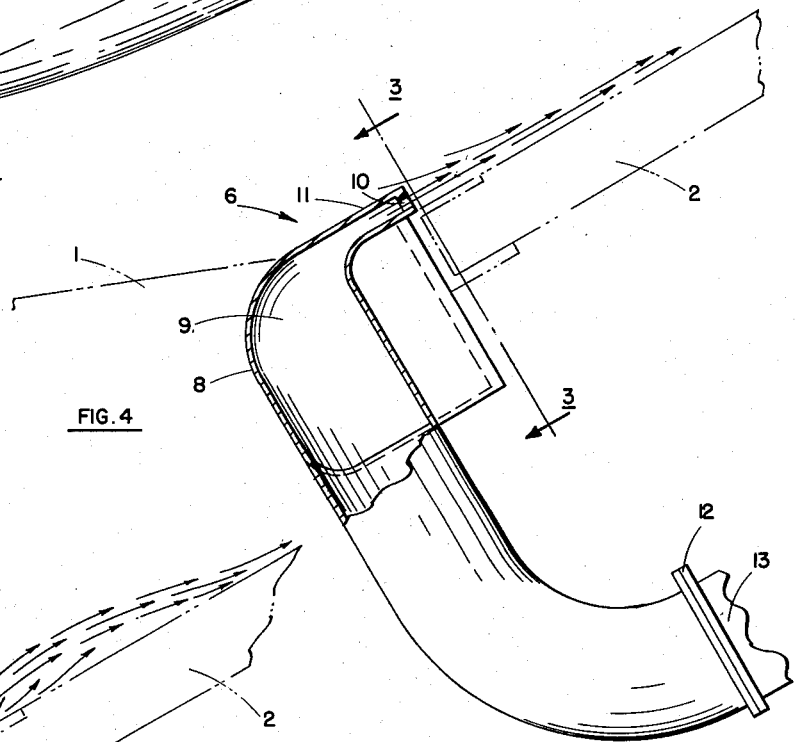
Fig. 4 is a sectional view of the manifold and nozzle, taken along line 4—4 of Fig. 3, but with the nozzles inclined to the position of installation.
Figure 2:
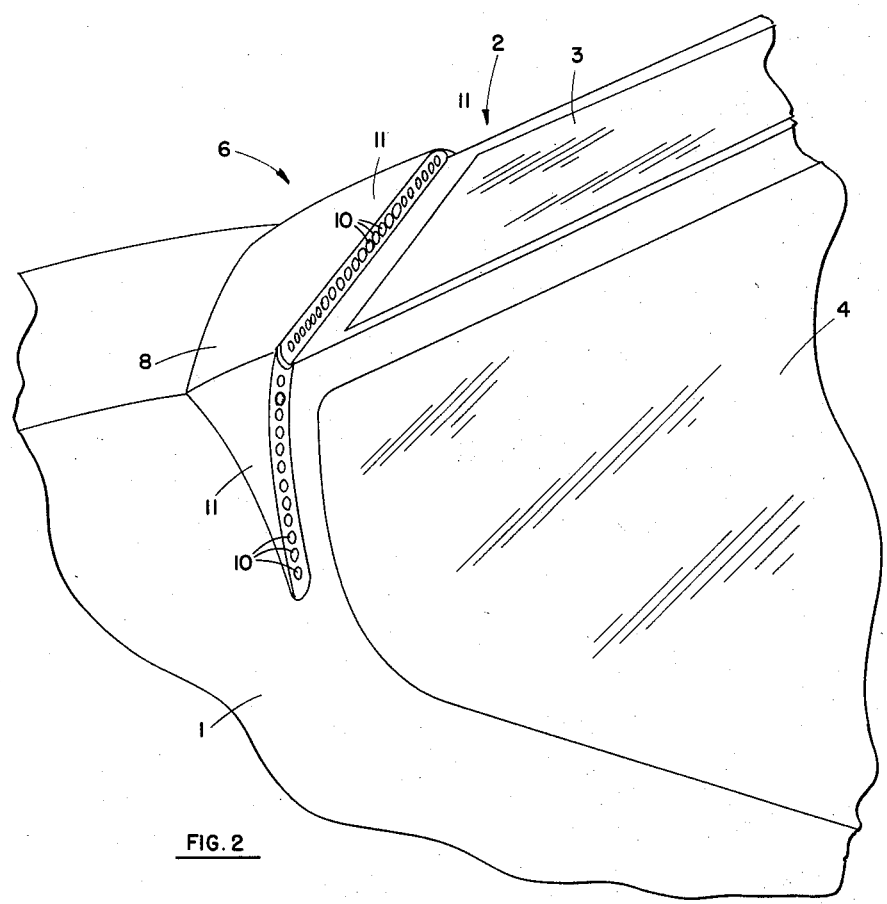
Fig. 2 is a perspective view of the nozzles installed at a windshield base.
Figure 3:
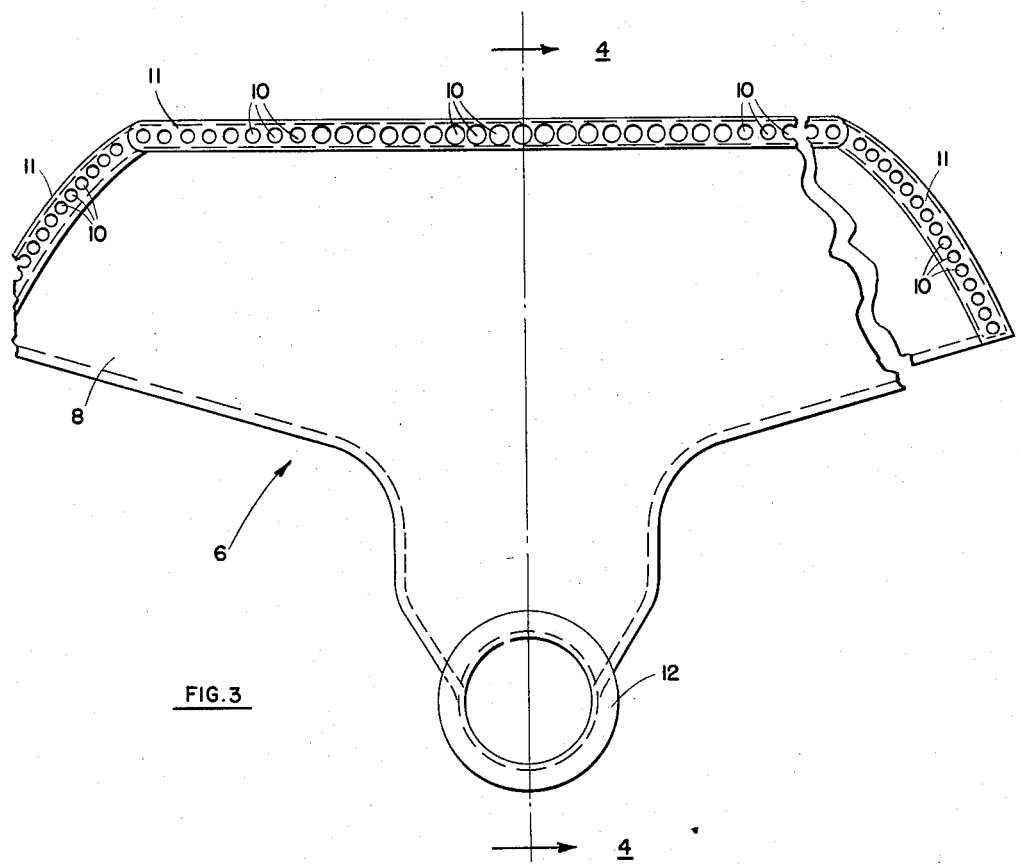
Fig. 3 is a top plan view of a manifold and nozzle arrangement.

According to this invention an air discharge means 6 is disposed at the base of the windshield panels where the anti-icing and rain removal is to be effected. Discharge means 6, as illustrated in Figs. 3 and 4, may comprise a manifold 8 having a main passageway 9 communicating with a plurality of closely spaced openings 10 extending through an upper projection portion 11 of the manifold. These openings 10 may be simply of cylindrical shape and serve as a series of adjacent nozzles which, in the usual embodiment, discharge co-directionally. Manifold 8 is mounted on the aircraft structure in the manner illustrated in Figs. 2 and 4 so that nozzles 10 are at the bottom edge of the windshield and directed upwardly along the windshield and substantially parallel thereto. The nozzles are thereby positioned to discharge substantially in the direction of the windstream passing over the windshield when the aircraft is in flight.

The bottom of the manifold terminates in a fitting 12 which connects with pipe 13 extending to an outlet of the jet engine air compressor 14. A valve 15 is in air line 13 and serves to control the outlet from the compressor to this line. This valve is preferably remotely operable and of the electrically controlled type. Also included in this line is a drain valve 16 which disposes of moisture which may collect in the air line.

In effecting an anti-icing and rain removal function by the apparatus just described, valve 15 is opened so as to bleed air from the engine compressor. This pressurized air passes through line 13 and into manifold 8. The air then discharges from the manifold through the various openings 10 in the upper portion of the manifold and passes upwardly along the windshield adjacent and substantially parallel thereto. The outlet nozzle size and shape and compressor pressure should be correlated so that as the air leaves the nozzles 10 it will be at approximately sonic velocity. Therefore, the stream of air from the manifold passes upwardly through the boundary layer along the surface of the windshield at great velocity and encounters any particles of moisture in the air stream heading toward the windshield. When the high-speed stream of air from the manifold strikes these moisture particles they will be broken into very fine fragments. These smaller moisture particles will have a reduced inertia so that they are then deflected past the windshield by the high-speed air stream from nozzles 10. In this manner the windshield is kept clear of ice and rain and the pilot's visibility is unimpeded. Additionally this high-speed air stream tends to evaporate the moisture around the windshield to assist in keeping it clear.

The air which is utilized for the purpose of rain and ice removal as described above may be at approximately 250° F. by reason of its pressurization in the engine compressor. Air of this temperature directed against a glass windshield panel, with presently utilized materials, will often result in cracking of the windshield. Therefore, it is preferred to provide a large number of small discharge nozzles 10, as illustrated and described, because as the heated air leaves these nozzles additional air will be entrained therewith from the surrounding atmosphere. This additional air will serve to cool the air from the nozzles so that damage to the windshield is prevented. It has also been found that a plurality of nozzles 10 as illustrated is particularly effective in carrying a high-speed stream of air far up the windshield so that maximum moisture removal is obtained. This design has the further advantage of being very simply constructed and easily installed on the vehicle.

Figure 5:
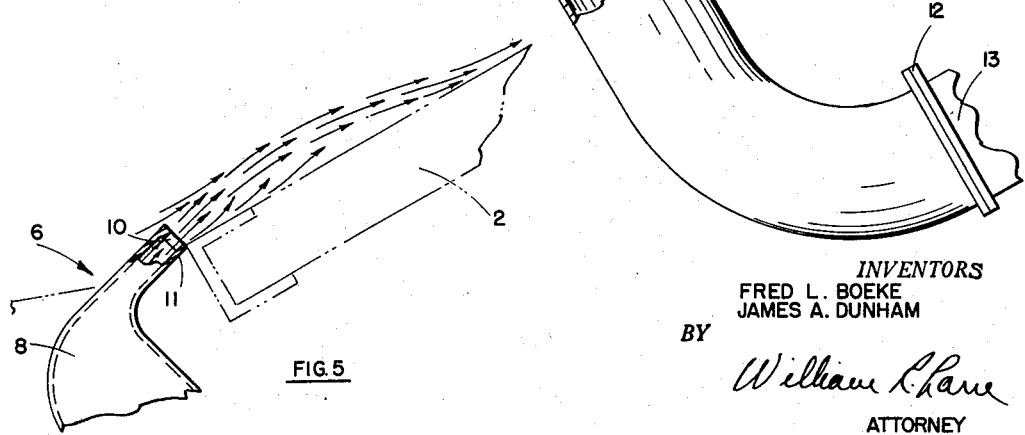
Fig. 5 is a sectional view similar to Fig. 4, but of an alternate nozzle installation.

In order to obtain additional entrainment of ambient air, and thus further lower the temperature of the air passing in front of the windshield, the embodiment of Fig. 5 may be used. Here the nozzles are inclined forwardly at an acute angle to the windshield so that at the initial point of discharge the stream of high-speed air is entirely surrounded by the air passing over the vehicle. This means that additional air can be more readily entrained by the discharge air. The air from nozzles 10 will be deflected backwards as it moves upwardly, as shown by the arrows, so that it will be brought closer to the windshield instead of continuing at an angle thereto. This modification may also be used to advantage in flush installations of the discharge nozzles where no portions of the nozzles extend above the mold line of the airplane.

However, it is not necessary or desirable that the air directed along the windshield be cooled completely. This is because of the evaporative effect of this air which assists in maintaining the windshield clear.

It is not necessary to have the nozzles positioned to discharge exactly in alignment with the air stream over the windshield, but they should discharge generally in that direction. Otherwise the nozzle discharge will rapidly mix with the surrounding air and will not be effective in moisture removal.

Figure 6:
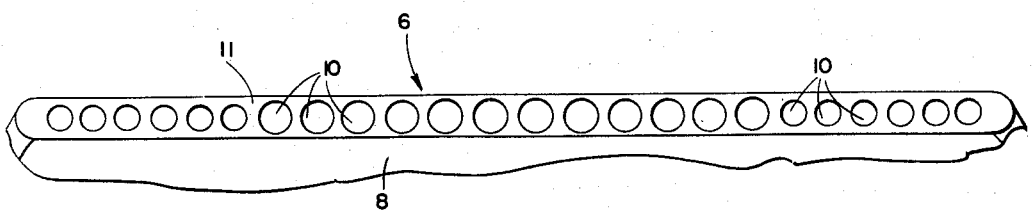
Fig. 6 is a top plan enlarged view of the nozzles.

The size of nozzles 10, as may be seen in the enlarged showing of Fig. 6, may vary along the length of the manifold member. This is because a greater quantity of air will be required where the windshield has its maximum height in order to completely effect moisture removal, and also the moisture problems are more severe on the forward portions of a panel than on the side portions thereof. Thus, for example, in one installation successfully used the central nozzles 10 are around 0.266 inch diameter while those farther to one side are 0.250 inch and those on the end are only 0.194 inch. Spacing between the centers of nozzles 10 may vary from around a quarter of an inch between the smaller openings to 0.35 inch at the central nozzles for the embodiment illustrated. In any event, the spacing of the nozzles should be such that the discharge will substantially blanket the surface of the panel to prevent moisture formation over the entire area, while at the same time picking up enough ambient air to cool the air stream. For an example of quantities of air which may be required in typical installations it has been found that for center panel 3 four pounds per minute of air per inch of width of windshield has operated satisfactorily in effecting moisture removal. For side panels of the windshield only two and one-half pounds per minute per inch have been necessary. Nozzle openings for the side panels may be smaller because of the lesser air flow requirements. Of course the particular quantities required, nozzle size and spacing, and compressor pressure will depend upon the vehicle itself, its speed and the amount of moisture which it will tend to collect on the surfaces involved.

One of the desirable features about effecting moisture removal by the provisions of this invention is that the nozzles and the stream of air so discharged along the surface of the panel involved will not result in an appreciable aerodynamic disturbance which might be detrimental to the performance of the aircraft. It should be borne in mind that it is important for the successful operation of this invention that the air leave the nozzles at very close to the speed of sound. If this is not the case the effectiveness of the arrangement for removing moisture is greatly reduced. Speeds greater than Mach 1 will also operate properly in removing moisture, but are not necessary in the usual case. The anti-icing effect is less adversely affected by slower speed air, but rain removal requires the high speed air at near sonic velocity. Sufficient pressure for attaining this speed of air discharge is readily obtainable from the usual jet engine compressor. A Mach 1 air speed can be obtained with a pressure drop of 1.89 to 1.

Figure 7:
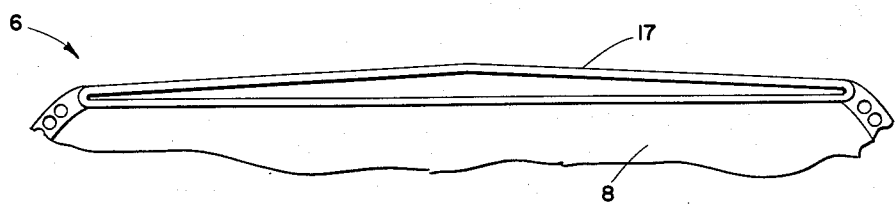
Fig. 7 is a top plan view of a modified nozzle.

As a modification of the invention the discharge nozzle may take the shape of nozzle 17 shown in Fig. 7. This type of nozzle does away with the plurality of individual discharge nozzles and emits all of the moisture removal air through one long opening. When given a slightly triangular shape as shown the air will carry far up the windshield and will thereby quite adequately deflect the moisture therefrom. However, with the design of Fig. 7 there is less air entrained by the discharge of the air from nozzle 17 so that the air traveling adjacent the windshield will have a higher temperature than in the case where a plurality of nozzles are provided. Therefore, there is more tendency to crack the windshield when the single elongated opening is utilized for discharging the anti-icing and rain removal air.

The moisture prevention arrangement of this invention is of course, not limited to use for a windshield or canopy. It could be applied with equal satisfaction to a radome or any other panel of an aircraft or other vehicle where moisture accumulation is a problem.

It is apparent from the foregoing that we have provided an arrangement which will effectively prevent moisture formations on the surface of a rapidly moving vehicle, yet which has the advantages of simplicity and economy of construction, light weight, reliability and absence of significantly detrimental aerodynamic effects. The arrangement of this invention utilizes engine compressor air which, for a jet propulsion engine, is readily available in large quantities. The provisions of this invention are equally applicable for any vehicle regardless of its power plant wherever there are large quantities of pressurized air available. Of course, it is not necessary that the discharge from the moisture removal nozzles be air, because another gas would perform equally well.

The foregoing detailed description is to be clearly understood as given by way of illustration and example only, the spirit and scope of this invention being limited only by the appended claims.

We claim:

1. In a jet powered aircraft having a compressor and an exterior panel, an arrangement for preventing moisture formation on said panel comprising a plurality of closely spaced fixed nozzles disposed adjacent an edge of said panel, said nozzles being positioned to discharge across the surface of said panel in substantially parallelism therewith in the general direction of the normal windstream across said panel, said nozzles being spaced closely enough to substantially blanket said panel with the discharge therefrom; manifold means interconnecting said nozzles; air passageway means interconnecting said manifold means and said compressor for receiving air therefrom at substantially 250° F. whereby compressed air from said compressor passes through said air passage means to said manifold means and discharges through said nozzles, said nozzles and said air compressor being of sufficient capacity to effect a continuous discharge at substantially sonic velocity at the discharge portion of said nozzles thereby sending a stream of hot air along the surface of said panel and deflecting moisture particles away from said panel while evaporating the said moisture particles, and entraining ambient air with said discharge from said nozzles whereby said air discharging from said nozzles is cooled sufficiently to prevent damage to said panel but not below a temperature that prevents effective evaporation of the moisture particles; and valve means in said air passage means for controlling the air flow therethrough.

2. In a jet propelled aircraft having a windshield and a compressor, an arrangement for preventing moisture formation on the windshield of said aircraft comprising an air passageway attached to said compressor for bleeding pressurized air therefrom in a condition where such air is at a temperature of at least 250° F. by reason of compression therein; valve means in said air passageway for controlling flow therethrough; a drain valve in said air passageway for eliminating moisture therefrom; a manifold connected with said air passageway for receiving pressurized air therefrom, said manifold being mounted on said aircraft adjacent said windshield, said manifold having a plurality of closely spaced adjacent outlet nozzles extending therefrom at an edge portion of said windshield positioned to discharge substantially in the direction of the windstream across said windshield and to provide an air stream substantially adjacent said windshield when said aircraft is in motion, said nozzles being of a dimension correlated with the pressure of said air from said compressor to provide a pressure drop through said nozzles sufficient to obtain a continuous air discharge at sonic velocity, whereby the air stream from said nozzles encounters moisture particles in the surrounding atmosphere for breaking up said particles and deflecting said particles away from said windshield thereby to maintain said windshield free of moisture.

3. An arrangement for preventing moisture formation on a panel of an aircraft having an engine equipped with a compressor, said arrangement comprising an air passageway attached to said compressor for receiving a portion of the pressurized air therefrom when such air is in the neighborhood of 250° F. by reason of its compression; a manifold attached to said air passageway for receiving pressurized air therefrom, said manifold being mounted on said aircraft adjacent a panel thereof, said manifold having a series of adjacent closely spaced discharge nozzles extending therefrom at one side of a portion of said panel to be maintained free of moisture, and aligned to discharge across said panel portion and adjacent thereto when said aircraft is in motion; said nozzles being spaced whereby said panel portion is substantially blanketed by the discharge from said nozzles, the size of said nozzles being correlated with the pressure of said air from said compressor to provide sufficient pressure drop whereby a continuous discharge of hot air at substantially sonic velocity is obtained at the outlets of said nozzles, whereby the discharge air from said nozzles contacts moisture in the atmosphere and breaks said moisture into fine particles which are deflected away from said panel and evaporated by said hot discharge air thereby maintaining said panel free of moisture.

4. A device as recited in claim 1 in which said nozzles and said compressor are correlated to discharge from about 2.5 to 4.0 pounds of air per minute for each inch of width of said panel.

References Cited in the file of this patent

UNITED STATES PATENTS

| | | |
|---|---|---|
| 1,574,400 | McGraw | Feb. 23, 1926 |
| 2,312,187 | Patterson | Feb. 23, 1943 |
| 2,367,426 | Patterson | Jan. 16, 1945 |
| 2,482,720 | Sammons | Sept. 20, 1949 |

FOREIGN PATENTS

| | | |
|---|---|---|
| 674,610 | France | Oct. 20, 1929 |
| 714,938 | Germany | Dec. 10, 1941 |